(12) United States Patent
Pearce

(10) Patent No.: US 11,518,033 B2
(45) Date of Patent: Dec. 6, 2022

(54) METHOD AND APPARATUS FOR SAFELY LIMITING THE MOTION OF A MOTOR

(71) Applicant: KOLLMORGEN CORPORATION, Radford, VA (US)

(72) Inventor: Robert Pearce, Bristol (GB)

(73) Assignee: KOLLMORGEN CORPORATION, Radford, VA (US)

( * ) Notice: Subject to any disclaimer, the term of this patent is extended or adjusted under 35 U.S.C. 154(b) by 220 days.

(21) Appl. No.: 16/921,327

(22) Filed: Jul. 6, 2020

(65) Prior Publication Data

US 2022/0001539 A1 Jan. 6, 2022

(51) Int. Cl.
*G05B 19/05* (2006.01)
*B25J 9/16* (2006.01)
*H02P 23/14* (2006.01)

(52) U.S. Cl.
CPC ........... *B25J 9/1674* (2013.01); *B25J 9/1694* (2013.01); *G05B 19/058* (2013.01); *H02P 23/14* (2013.01)

(58) Field of Classification Search
CPC ..... B25J 9/1674; B25J 9/1694; G05B 19/058; H02P 23/14
See application file for complete search history.

(56) References Cited

U.S. PATENT DOCUMENTS

| | | | | |
|---|---|---|---|---|
| 2002/0161492 A1* | 10/2002 | Eckardt | .................... | G05B 9/03 701/22 |
| 2011/0241447 A1* | 10/2011 | Ando | ................. | G05B 19/4063 307/326 |
| 2012/0299578 A1 | 11/2012 | Korrek | | |
| 2013/0054724 A1* | 2/2013 | Yundt | ............... | H04L 12/40182 709/208 |
| 2014/0129000 A1 | 5/2014 | Block et al. | | |
| 2016/0006237 A1 | 1/2016 | Helmerth et al. | | |
| 2018/0123498 A1* | 5/2018 | Tanabe | ................. | G05B 19/058 |
| 2018/0294762 A1* | 10/2018 | Matsumura | ........... | H02P 29/024 |
| 2020/0358340 A1* | 11/2020 | Guru | ....................... | H02P 29/00 |
| 2020/0403552 A1* | 12/2020 | Chang | ..................... | H02M 7/00 |
| 2021/0296882 A1* | 9/2021 | Knudsen | ................. | H02P 23/14 |

FOREIGN PATENT DOCUMENTS

EP 3388906 A1 10/2018

OTHER PUBLICATIONS

International Search Report and Written Opinion issued in corresponding international application No. PCT/US2020/042468, dated Mar. 18, 2021, 17 pages.

* cited by examiner

*Primary Examiner* — Gary Collins
(74) *Attorney, Agent, or Firm* — Day Pitney LLP; Anthony A. Kassas

(57) ABSTRACT

An electric motor drive system is provided wherein safety is achieved by commanding the process system of the relevant axis or set of axes to execute motion that follows a defined path, namely trajectory of position, velocity and acceleration against time, re-constructing an identical trajectory in the safety system and in, the safety system, supervising deviations between the safely reconstructed target position and the safe measurement of position.

12 Claims, 3 Drawing Sheets

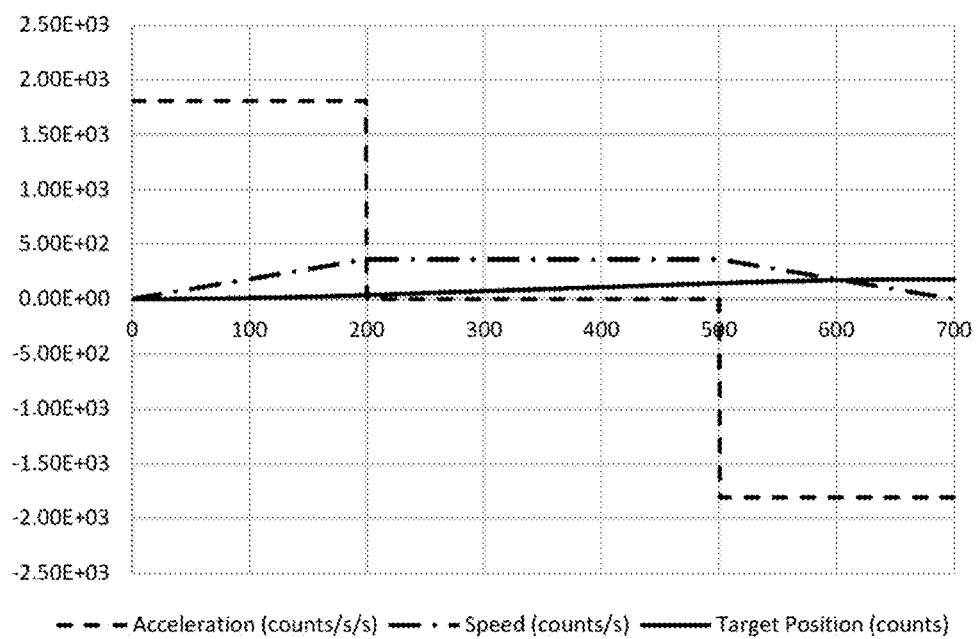

METHOD AND APPARATUS FOR SAFELY LIMITING THE MOTION OF A MOTOR

FIELD OF THE INVENTION

The invention relates to electrical machinery, and particularly to electrical machinery where there is an interaction between the machinery and personnel during operation or maintenance. Example industries for such electrical machinery may include automotive manufacture, food, packaging, textiles, robotic, electronic assembly, metal forming and many others.

BACKGROUND

Maintenance personnel often require a machine to be semi-operational in order to carry out such activities as cleaning, lubrication, replacement of a spare part or retrieval of a deformed workpiece or removal of a foreign object. Semi-operational in this context often means that part or parts of a machine are moving but so slowly that injury is either impossible or at least can be easily avoided by trained personnel.

In some regions, including the European Union, there is a mandatory requirement for the machinery to have a safety system. A current good practice is for the safety system to be distinct from the process control system, at least in software and usually in hardware too. That is to say that the motion of the machinery is activated, controlled and sequenced by the process control system whereas the responsibility for ensuring that these actions are safe falls upon the safety system.

DESCRIPTION OF RELATED ART

In an automated machine, the process control system is typically embodied as servo motors and drives and these may be co-ordinated by a central PLC (programmable logic control) or motion controller. In the same machine, the safety system is typically embodied as set of safety subsystems in servo drives that are optionally coupled to a central safety PLC or alternatively that are directly connected to safety devices such as light currents, electromechanical door locks and pressure matts.

As an example, should it become necessary to retrieve a deformed workpiece from a machine, such retrieval can be achieved in safety using a sequence of steps:
  STEP 1. The operator first presses a button marked "Maintenance Mode 1;"
  STEP 2. In response to STEP 1, the process control system slows down the machine;
  STEP 3. The safety system checks that the machine is moving more slowly than the maintenance mode safe limit speed;
  STEP 4. The safety system releases a guard door lock;
  STEP 5. The operator opens the guard door and retrieves the deformed workpiece;
  STEP 6. The operator shuts the guard door;
  STEP 7. The operator presses a button marked "Resume Operation;"
  STEP 8. In response to STEP 7, the safety system suspends checking that the machine is moving more slowly than the maintenance mode safe limit speed; and
  STEP 9. The process control system resumes normal operation of the machine.

In this case, the safety system supervises the machine by enforcing a speed limit during maintenance. If the speed limit is breached, then there is a fault reaction such as turning off the motor torque and, optionally, applying the brake—thereby bringing the machine to a standstill. The standard "IEC 61800-5-2:2016 Adjustable speed electrical power drive systems—Part 5-2: Safety requirements—Functional" defines a safety function called SLS (safely limited speed), the same standard also defines other safety functions including STO (safe torque off: namely de-energising the motor windings), SBC (safe brake control), SLP (safely limited position) and SLA (safely limited acceleration). U.S. Pat. No. 10,520,050 to Pearce teaches the operation of safe brake control. U.S. Pat. No. 8,566,415 to Yundt teaches an implementation of safe torque off. DE Patent Publication No. 10,361,132 to Adams teaches a technique for minimising injury by containing the kinetic energy of the moving part of the machine along the path of motion.

A safety system that implements a safety function must use safe elements throughout the safety chain. It is common practice for the safety system to measure speed using a safety rated encoder. A safety rated encoder is a device that provides two independent measurements of shaft angle (or position—as there are also linear devices) to two safety channels; such a safety rated encoder is approved by a notified body and is characterised by safety ratings such as SIL2/SIL3 and safety-related accuracy. A safety rated encoder also has non-safe properties, this is because the same encoder can further be used by the process control system for velocity and/or position loop closure. The conservative nature of safety engineering means that the safety-related accuracy, as used by the safety system, is much coarser than the position increment that is available to the process control system. A representative example of a safe encoder is type EEM37-2KF0A017A from Sick-Stegmann; this device has an angular resolution of 17 bits (0.00274°) for the process control system but a safety-related accuracy (also called safe position increment) of only 8.49 bits (1°). Herein, the process sub-system is that part of the electric drive not concerned with functional safety, of which the drive control logic is the chief element.

As an alternative to using a safety rated encoder, it is alternatively possible to use two ordinary encoders (the term 'encoder' also includes resolver), the two sets of position signals are compared by the safety system. The resulting safe measurement of position has less resolution and accuracy than each encoder because of the need to account for shaft twist, coupling slop, and other practical limitations. Therefore deriving a safe position measurement from two ordinary encoders is essentially equivalent in both concept and performance to using a single, safety rated encoder that sends to sets of position measurements and will not be considered further.

Both the process control system and safety system compute velocity by differencing successive position measurements on a periodic basis. 1 kHz is a typical periodic rate for safety systems, referred to herein as the safety tick rate. Under these conditions, if the limit speed is 60 RPM, then this equates to 360 safe position increments per second but only 0.36 safe position increments per tick of the safety system (safety-related accuracy/safety tick rate=360/1000). Monitoring such low speeds is therefore problematic for the safety system because the speed computed by periodic differencing alone is too coarsely quantised to be compared directly against a limit value. The common solution to this problem is to filter the computed velocity (e.g. using a first order lag) to obtain more resolution; practical filter time constants are in the range 10-100 ms. If the motor exceeds the speed limit by 10% then, after ~2.4 filter time constants, the output of the velocity filter will exceed the limit value; if the time constant of the filter is say 10 ms, then the filter increases the fault reaction time by 24 ms. Long fault reaction times reduce the effectiveness of the safety system because the motor may accelerate between the instant that the speed limit is exceeded and the instant that the excess speed is detected. A further disadvantage of filtering the safe velocity is that it may be difficult for the user to understand the interaction of the desired limitation of speed with the filter time constant and the fault reaction time.

An alternative to filtering the coarsely quantised velocity measurement is to extend the acquisition interval, for example if there are 0.36 safe position increments per millisecond then the resolution can be increased by differencing the positions every say 32 ms as this will reduce the perceived speed ripple to ~9% which is usable; however this technique has similar latency problems to filtering and the consequently the same long fault reaction times. For the present purposes this technique can be considered as a variant of filtering.

There exists a need in the art for a control system that provides safe supervision of motion without suffering the penalty of the slow fault reaction times associated with filtering the velocity computed from position signals read from a safe encoder.

SUMMARY OF THE INVENTION

In the foregoing example of the operator retrieving a deformed workpiece from the machine, the related parts of the machine must run slowly enough that operator can easily avoid injury. In the prior art, this objective was achieved by the safety system enforcing a maximum instantaneous speed using SLS on an axis or set of axes.

In the electric motor drive system in accordance with the instant invention, equivalent safety is achieved by commanding the process system of the relevant axis or set of axes to execute motion that follows a pre-defined path, namely trajectory of position, velocity and acceleration against time, re-constructing an identical trajectory in the safety system and, also in the safety system, supervising deviations between the safely reconstructed target position and the safe measurement of position. The electric motor drive system of the invention may be referred to as Safe Path Motion (SPM) herein.

In a preferred embodiment of the invention, a drive system is provided for an electric motor comprising a power amplifier coupled to the electric motor and drive control logic with a multi-channel safe torque-off circuit, the drive circuit coupled to the power amplifier. A multi-channel position feedback encoder is provided that is coupled to the electric motor, the multi-channel position feedback encoder having a functional safety sub-system on each channel, and at least one channel of the multi-channel position feedback encoder being coupled to the drive control logic. Each of the functional safety sub-systems is coupled to a channel of the multi-channel safe torque-off circuit. The drive control logic and the functional safety sub-systems simultaneously compute electric motor motion trajectories constrained not to exceed a target safe speed limit. The functional safety sub-systems monitor the deviation of the actual position of the electric motor from the demand position of the electric motor and shuts down the power amplifier by acting on at least one of the channels of the multi-channel safe torque-off circuit. The drive control logic acts on the power amplifier such that the motion of the electric motor follows the trajectory.

BRIEF DESCRIPTION OF THE DRAWINGS

The features and advantages of the invention are apparent from the following description taken in conjunction with the accompanying drawings in which:

FIG. 4 illustrates the trajectory of target position in a point-to-point movement.

DETAILED DESCRIPTION OF THE DRAWINGS

It may be appreciated that the list of safety functions defined in the standard "IEC 61800-5-2:2016 Adjustable speed electrical power drive systems—Part 5-2: Safety requirements—Functional" is not exhaustive and the manufacturer of safety equipment can devise new safety functions and have them certified in co-operation with a notified body.

Figure 1:
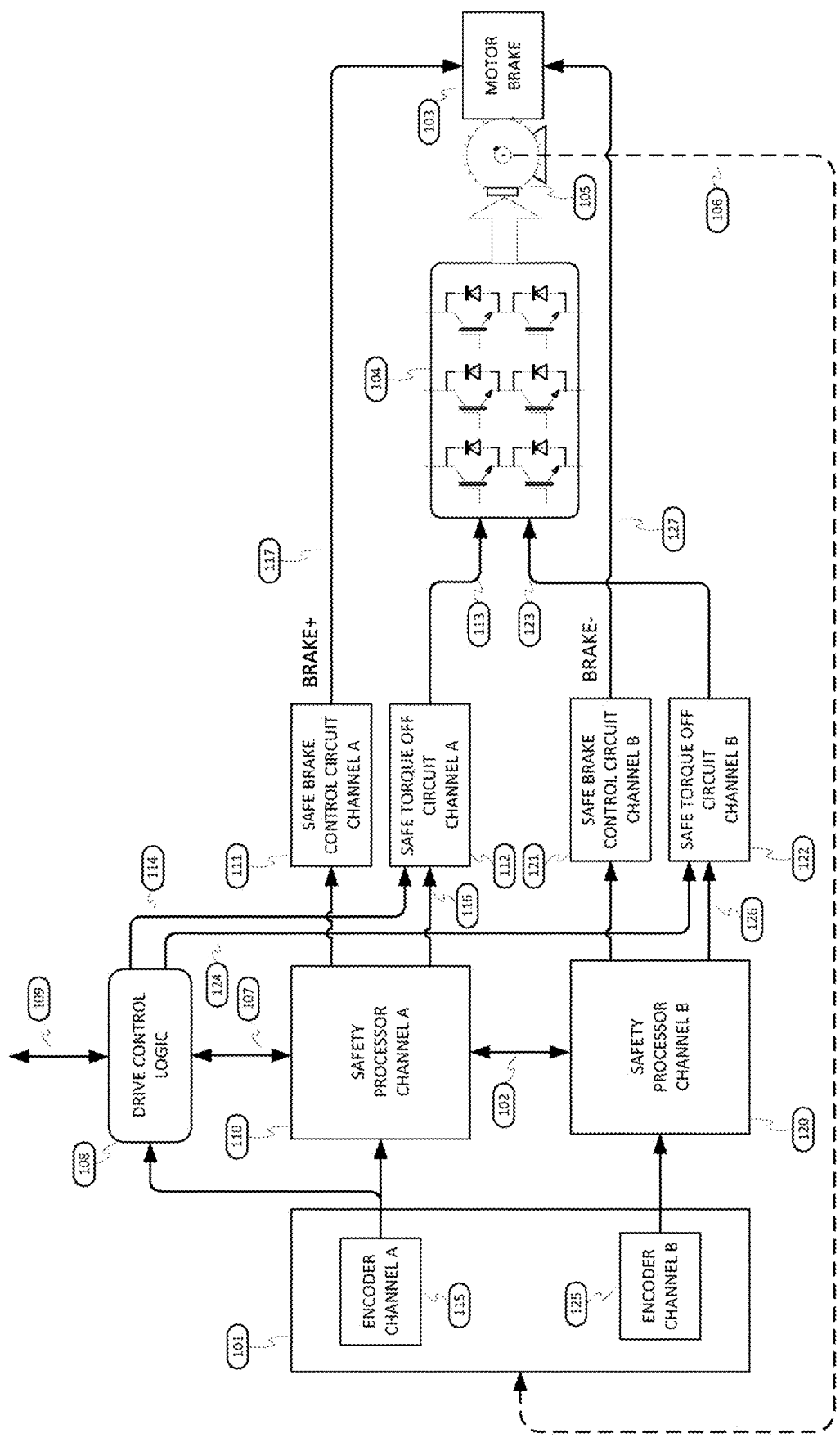
FIG. 1 illustrates the structure of a safety sub-system in a motor drive in accordance with the invention.

FIG. 1 shows the elements of an electric motor drive with a built-in safety controller in accordance with an embodiment of the present invention.

The process sub-system, distinguished as rounded elements, comprises the drive control logic 108, the power amplifier circuit 104 for controlling current in motor windings, and the electric motor 105. A safety rated encoder 101 has two channels of position measurement 115 and 125, coupled to electric motor 105, with two signals to indicate position. Alternatively, two distinct encoders may be coupled to electric motor 105. A mechanical coupling 106 is provided between the electric motor 105 and the encoder 101. The drive control logic 108 can be configured via at least one configuration port 109, which can be any of a serial port, wireless port, field bus port, memory card interface and the like. Configuration port 109 can also serve as a run-time command interface. Configuration port 109, in combination with the inter-processor interfaces 102 and 107, permits the parameterisation of the safety processors 110 and 120.

In response to the position of the motor measured by one channel, in this case the A channel 115, of the safety encoder 101, the drive control logic 108 emits a first set of PWM pulse trains 114 for the control of the high side switching elements of the power amplifier 104 and a second set of PWM pulse trains 124 for the control of the low side switching elements of the power amplifier 104. Under normal operation, that is when the safety sub-system does not intervene, the two sets of PWM pulse trains 114 and 124 pass through elements 112 and 122 without modification to emerge as the two sets of PWM pulse trains 113 and 123 that control the power amplifier 104. For the sake of clarity, FIG. 1 does not illustrate all elements such as the power input, internal power supplies, communication ports and the like that are necessary for the operation of the drive. These elements are well known to those skilled in the art and are not essential to the understanding of the instant invention.

The safety sub-system, distinguished as rectangular elements in FIG. 1, comprises two safety channels A and B arranged to form a what is termed a "1oo2" structure or a "1oo2D" structure in the literature of functional safety, herein "1oo2" embraces "1oo2D". Each safety processor 110/120 can monitor the other 120/110 by intercommunication through inter-processor interface 102; this cross-monitoring includes each safety processor 110/120 checking that the deviation between the two position measurements from 115 and 125 is within prescribed bounds.

A failsafe electro-mechanical motor brake 103 is attached to the shaft of the electric motor 105. The motor brake is driven by two control lines 117 BRAKE+ and 127 BRAKE−. To release the brake signal BRAKE+ must be driven high and signal BRAKE− must be driven low. To apply the brake either or both BRAKE+ and BRAKE− is de-energised by element 111/121 respectively and this way the current in the brake is interrupted thereby applying the brake.

The power amplifier is driven by two sets of control lines, the first set of PWM pulse trains 113 for the upper switching elements and the second set of PWM pulse trains 123 for the lower switching elements. De-energising either the first set of PWM pulse trains 113 or the second set of PWM pulse trains 123 by the action of element 112/122 respectively will stop current flow in the motor and it is by this means that STO is applied. Elements 112/122 are implemented in failsafe manner, i.e., they operate correctly or if they fail then they fail to the safe state; Figure B.3 in "Adjustable speed electrical power drive systems—Part 5-2: Safety requirements—Functional (IEC 61800-5-2:2016)" shows a possible realization.

The channel A safety processor 110 communicates with the drive control logic 108 via signals 107 and is thereby informed (during a safe configuration process) of the parameters that define the trajectory of motion that is subsequently to be supervised. The channel A safety processor 110 reads the channel A position 115 of the motor 105 and computes the deviation from the desired trajectory of motion. In the event of deviation from the desired trajectory beyond a prescribed bound, the channel A safety processor 110 applies a fault reaction being a configurable sequence of optional ramp down to zero speed, disable the power amplifier (STO) and optionally apply the brake (SBC). To apply STO, the channel A safety processor 110 blocks the first set of PWM pulse trains 114 from reaching the high side switching elements of the power amplifier 104 by de-energising the control input 116 of the channel A safe torque off circuit 112, and consequently the output set 113 of PWM trains is set to the inactive state. To apply SBC, the channel A safety processor 110 de-energises the input to channel A safe brake control circuit 111 thereby de-energising the output BRAKE+ and causing failsafe brake 103 to be applied.

The channel B safety processor 120 communicates via an inter-processor interface 102 with the channel A safety processor 110 and is thereby informed (during a configuration process) of the parameters that define the trajectory of motion that is subsequently to be supervised. The channel B safety processor 120 reads the channel B position 125 of the motor 105 and computes the deviation from the desired trajectory of motion. In the event of deviation from the desired trajectory beyond a prescribed bound, the channel B safety processor 120 applies a fault reaction. To apply STO, the channel B safety processor 120 blocks the second set of PWM pulse trains 124 from reaching the low side switching elements of the power amplifier 104 by de-energising the control input 126 of the channel B safe torque off circuit 122, and consequently the output set 123 of PWM trains is set to the inactive state. To apply SBC, the channel B safety processor 120 de-energises the input to channel B safe brake control circuit 121 thereby de-energising the output BRAKE− and causing failsafe brake 103 to be applied.

The drive control logic 108 and the safety processors 110 and 120 are often realized as single-chip micro-controllers but other types of processor, ASIC, FPGA or digital logic can alternatively be used. There are minor variations of FIG. 1 that do not change the essentials of the invention, for example the drive control logic could alternatively use position feedback from channel B 125, channel B safety processor 120 could have a further connection to the drive control logic 108, the safe torque off circuit for channel A 112 could alternatively operate on the PWM for the low side devices 124, the power amplifier is shown as having three phases but other numbers of phases are possible.

Figure 2:
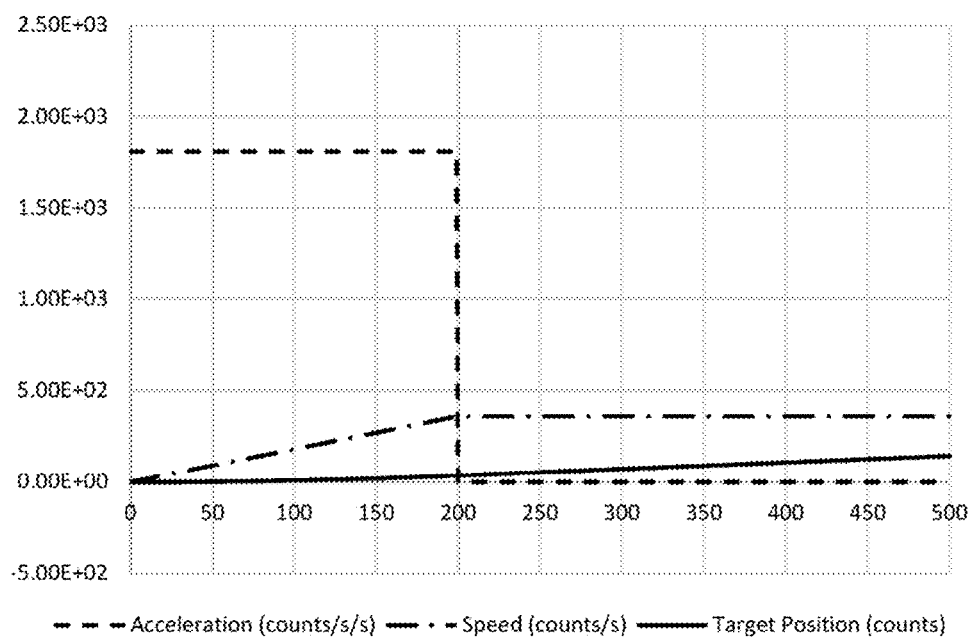
FIG. 2 illustrates an example trajectory of axis accelerating from rest to 1 RPS and then maintaining that velocity.
Figure 3:
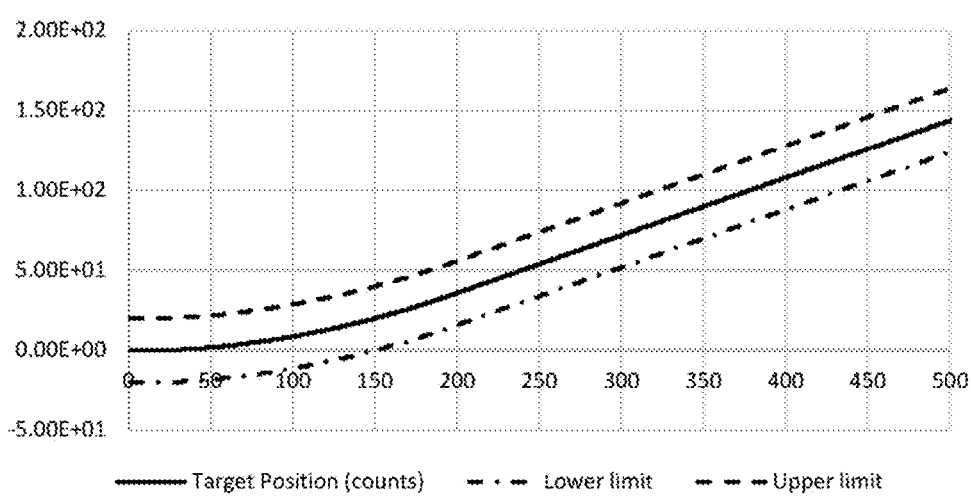
FIG. 3 illustrates the trajectory of target position and the instantaneous upper and lower limits.

FIG. 2 shows an example of a desired trajectory of an axis accelerating from rest to 1 RPS and then maintaining that velocity. The counts are denominated in safe position increments, thus 1 RPS is 360 counts/s. FIG. 3 is an enlarged version of FIG. 2 that shows only the trajectory of target position and the instantaneous upper and lower limits. In this case, the limits are +/−20° from the target position. The trajectory of motion is generated by the drive control logic 108 and is replicated in and supervised by the two safety processors 110 and 120 so that in the event that the measured position exceeds the target position by more than the prescribed limits each safety processor 110/120 de-energises its respective STO control output 116/126 so that the power amplifier 104 no longer drives current in the motor coils. Depending on the configuration of the fault reaction each safety processor 110/120 will also de-energise (and therefore apply) the motor brake 103.

It is entirely practical for the process control system to stay within the example limits shown in FIG. 3, even at low speeds, as the drive control logic 108 can close the velocity and position loops with high gains acting on the high resolution feedback 115 (17 bits when using the EEM37-2KF0A017A encoder).

The error bounds on position in FIG. 3 also serve as indirect limits on the velocity and acceleration as both velocity and acceleration must be specified in order to define the trajectory of position against time ('motion profile').

The trajectories for Safe Path Motion (SPM) can take a variety of forms, it can be 'accelerate to a target speed and maintain the target speed' (as FIG. 2 and FIG. 3), or it can be a point-to-point movement as FIG. 4 or any other movement type including camming and gearing.

SPM can be elaborated to multiple axes, each axis having its own prescribed path and error limits, in this way a multi-axis move can be safely monitored.

SPM does not require any filtering of the safe position measurement or of the derived safe velocity measurement. As mentioned above, such filtering increases the fault reaction time. Such filtering is also difficult for the user to evaluate and configure because the reaction time depends upon both the filter time constant and the size of the deviation from the limit value. SPM only requires the configuration of the deviation from the target value and there are no time constants to configure.

SPM can co-exist with other motion safety functions that can be in force simultaneously if so desired, for example SLT (safely limited torque) or SLA (safely limited acceleration).

Although this invention has been shown and described with respect to exemplary embodiments thereof, it should be understood by those skilled in the art that the foregoing and various other changes, omissions, and additions in the form and detail thereof may be made therein without departing form the spirit and scope of the invention. Accordingly, the present invention has been shown and described by way of illustration rather than limitation.

What is claimed:

1. A drive system for an electric motor, comprising,
a power amplifier coupled to the electric motor;
drive control logic with a multi-channel safe torque-off circuit, the multi-channel safe torque-off circuit coupled to the power amplifier;
a multi-channel position feedback encoder coupled to the electric motor, the multi-channel position feedback encoder having at least one channel of the multi-channel position feedback encoder coupled to the drive control logic; and
a functional safety sub-system on each channel of the multi-channel position feedback encoder, each of the functional safety sub-systems coupled to a channel of the multi-channel safe torque-off circuit;
wherein the drive control logic and the functional safety sub-systems simultaneously compute an electric motor motion trajectory limited by a maximum target safe speed;
wherein the functional safety sub-systems simultaneously monitor a deviation of an actual position the electric motor from a demand position of the electric motor, the functional safety sub-systems configured to shut down the power amplifier by acting on at least one of the channels of the multi-channel safe torque-off circuit; and
wherein the drive control logic acts on the power amplifier to ensure a motion of the electric motor follows the trajectory, each functional safety sub-system replicating the trajectory and monitoring deviations from the trajectory against prescribed limits.

2. A drive system according to claim 1, wherein the drive control logic and the functional safety sub-systems compute electric motor trajectories based upon a set of parameters that define the trajectories having previously been configured in the drive control logic and the functional safety sub-systems prior to movement of the electric motor.

3. A drive system according to claim 1, wherein the multi-channel safe torque-off circuit is a two-channel safe torque-off circuit.

4. A drive system according to claim 1, wherein the multi-channel position feedback encoder is a safety-rated two-channel position feedback encoder.

5. A drive system according to claim 1, wherein the functional safety sub-system is a 1oo2 functional safety sub-system.

6. A drive system according to claim 5, further comprising a processor on each channel of the 1oo2 functional safety sub-system.

7. A drive system according to claim 6, wherein the processors compute the derivative of demand position against time.

8. A drive system according to claim 5, wherein the channels of the 1oo2 functional safety sub-system are coupled for inter-channel communication.

9. A drive system for an electric motor, comprising:
a power amplifier coupled to the electric motor;
drive control logic with a two-channel safe torque-off circuit, the two-channel safe torque-off circuit coupled to the power amplifier;
a safety-rated two-channel position feedback encoder coupled to the electric motor, at least one channel of said position feedback encoder being coupled to said drive control logic; and a 1oo2 functional safety sub-system for the encoder, the 1oot functional safety sub-system having a processor on each of two channels with inter-channel communication, the functional safety sub-system coupled to the two-channel safe torque-off circuit;
wherein the drive control logic and the processors of the 1oo2 functional safety sub-system simultaneously compute a motion trajectory limited by a maximum target safe speed;
wherein the processors of said 1oo2 functional safety sub-system simultaneously monitor a deviation of an actual position of the electric motor from a demand position of the electric motor, the 1oo2 functional safety sub-system configured to shut down the power amplifier by acting on at least one of the channels of the two-channel safe torque-off circuit; and
wherein the drive control logic acts on the power amplifier such that the motion of the electric motor follows the trajectory, each functional safety sub-system replicating the trajectory and monitoring deviations from the trajectory against prescribed limits.

10. A symmetric drive system for an electric motor comprising:
a power amplifier having high side switching elements and low side switching elements for controlling current in windings of the electric motor;
drive control logic generating a channel A set of PWM pulse and a channel B set of PWM pulse trains;
a two-channel position feedback encoder coupled to the electric motor for generating a channel A position signal and a channel B position signal;
a channel A safety processor receiving the channel A position signal from the two-channel position feedback encoder;
a channel B safety processor receiving the channel B position signal from the two-channel position feedback encoder;
a channel A safe torque circuit coupled to the channel A safety processor, the channel A safe torque circuit configured to selectively provide the channel A set of PWM pulse trains to the high side switching elements;
a channel B safe torque circuit coupled to the channel B safety processor, the channel B safe torque circuit configured to selectively provide the channel B set of PWM pulse trains to the low side switching elements,
wherein: under normal operation mode, the channel A and B sets of PWM pulse trains pass through the channel A and channel B safe torque circuits to control the power amplifier; and under failsafe operation mode, de-energising either the channel A or B set of PWM pulse trains stops current flow in the electric motor based on the respective channel A or B safety processor reading the channel A or B position signals from the two-channel position feedback encoder and computing a deviation beyond a prescribed bound from a desired trajectory of motion.

11. A symmetric drive system as recited in claim 10, further comprising an intercommunication between the channel A and B safety processors so that each safety processor checks that the computed deviations based on the channel A and B position signals are within prescribed bounds.

12. A symmetric drive system as recited in claim 10, further comprising: a channel A brake control circuit coupled to the channel A safety processor, the channel A brake control circuit configured to actuate a brake of the electric motor in the failsafe operation mode; and a channel B brake control circuit coupled to the channel B safety processor, the channel B brake control circuit configured to actuate a brake of the electric motor in the failsafe operation mode.

\* \* \* \* \*